United States Patent
Haller, Jr. et al.

(10) Patent No.: US 10,373,262 B1
(45) Date of Patent: *Aug. 6, 2019

(54) IMAGE PROCESSING SYSTEM FOR VEHICLE DAMAGE

(71) Applicant: CCC INFORMATION SERVICES INC., Chicago, IL (US)

(72) Inventors: John Laurence Haller, Jr., Kenilworth, IL (US); Darrin A. Smith, San Antonio, TX (US)

(73) Assignee: CCC INFORMATION SERVICES INC., Chicago, IL (US)

( * ) Notice: Subject to any disclaimer, the term of this patent is extended or adjusted under 35 U.S.C. 154(b) by 549 days.

This patent is subject to a terminal disclaimer.

(21) Appl. No.: 15/079,380

(22) Filed: Mar. 24, 2016

Related U.S. Application Data (63) Continuation-in-part of application No. 14/218,165, filed on Mar. 18, 2014, now abandoned.

(51) Int. Cl.
*G06Q 40/00* (2012.01)
*G06Q 40/08* (2012.01)
(Continued)

(52) U.S. Cl.
CPC ......... *G06Q 40/08* (2013.01); *G06K 9/00671* (2013.01); *G06K 9/46* (2013.01); *G06K 9/52* (2013.01); *G06Q 30/0283* (2013.01)

(58) Field of Classification Search
None
See application file for complete search history.

(56) References Cited

U.S. PATENT DOCUMENTS 4,236,211 A * 11/1980 Arvesen ............... C12Q 1/18
356/246
6,182,048 B1   1/2001 Osborn et al.
(Continued)

OTHER PUBLICATIONS

Taylor, S. A., "Assessing the use of regression analysis in examining service recovery in insurance industry: Relating service quality, customer satisfaction, and customer trust." Journal of Insurance issues, 2001, 24, 1&2, pp. 30-57.*
(Continued)

*Primary Examiner* — Olabode Akintola
(74) *Attorney, Agent, or Firm* — Marshall, Gerstein & Borun LLP (57) ABSTRACT

An image processing system automatically processes a plurality of images of a damaged vehicle and determines replacements parts that are needed to repair the vehicle therefrom. The system includes a network interface via which the images are received, an image extraction component that generates a set of image attributes from the received images, a parts identifier component that generates indications of the needed replacement parts based on the image attributes and an information identification model, and an output interface via which the generated indications are provided. Additionally, the system includes a data storage entity storing data from multiple historical vehicle insurance claims, and a model generation component that generates the information identification model based on the historical claim data. The information identification model includes independent variable(s) corresponding to a set of image attributes that are more strongly correlated to replacement parts than are other attributes of the historical claim data.

24 Claims, 3 Drawing Sheets

(51) Int. Cl.
*G06Q 30/02* (2012.01)
*G06K 9/46* (2006.01)
*G06K 9/00* (2006.01)
*G06K 9/52* (2006.01)

(56) References Cited

U.S. PATENT DOCUMENTS

| | | |
|---|---|---|
| 6,408,321 B1 | 6/2002 | Platt |
| 6,470,303 B2 | 10/2002 | Kidd et al. |
| 6,812,048 B1 | 11/2004 | Kline |
| 7,072,841 B1 | 7/2006 | Pednault |
| 7,324,951 B2 | 1/2008 | Renwick et al. |
| 7,389,246 B1 | 6/2008 | Ohrt |
| 7,392,201 B1 | 6/2008 | Binns et al. |
| 7,398,218 B1 | 7/2008 | Bernaski et al. |
| 7,480,640 B1 | 1/2009 | Elad et al. |
| 7,502,772 B2 | 3/2009 | Kidd et al. |
| 7,509,235 B2 | 3/2009 | Bonissone et al. |
| 8,095,391 B2 | 1/2012 | Obora et al. |
| 8,135,599 B2 | 3/2012 | Simpson et al. |
| 8,200,513 B2 | 6/2012 | Vahidi et al. |
| 8,224,679 B1 | 7/2012 | Hopkins |
| 8,239,220 B2 | 8/2012 | Kidd et al. |
| 8,510,196 B1 | 8/2013 | Brandmaier et al. |
| 8,527,305 B1 | 9/2013 | Hanson et al. |
| 8,712,893 B1 | 4/2014 | Brandmaier et al. |
| 9,218,626 B1 | 12/2015 | Haller, Jr. et al. |
| 2002/0002475 A1 | 1/2002 | Freedman et al. |
| 2002/0007289 A1 | 1/2002 | Malin et al. |
| 2003/0101080 A1 | 5/2003 | Zizzamia et al. |
| 2003/0154111 A1 | 8/2003 | Dutra et al. |
| 2004/0024619 A1 | 2/2004 | DiBella |
| 2004/0093241 A1 | 5/2004 | Stone et al. |
| 2004/0128172 A1 | 7/2004 | Van Cleave et al. |
| 2005/0108063 A1 | 5/2005 | Madill et al. |
| 2005/0246206 A1 | 11/2005 | Obora et al. |
| 2005/0267774 A1 | 12/2005 | Merritt et al. |
| 2006/0050953 A1 | 3/2006 | Farmer et al. |
| 2007/0016542 A1 | 1/2007 | Rosauer et al. |
| 2007/0033076 A1 | 2/2007 | Sadeghi |
| 2007/0067191 A1 | 3/2007 | Loveland |
| 2007/0100669 A1 | 5/2007 | Wargin et al. |
| 2008/0255887 A1 | 10/2008 | Gruter |
| 2008/0281658 A1 | 11/2008 | Siessman |
| 2008/0281790 A1 | 11/2008 | Prosser et al. |
| 2009/0043615 A1 | 2/2009 | Belhe et al. |
| 2009/0083089 A1 | 3/2009 | Conchieri et al. |
| 2009/0138290 A1* | 5/2009 | Holden ............... G06Q 10/087 705/4 |
| 2009/0281841 A1 | 11/2009 | Basak et al. |
| 2010/0211494 A1 | 8/2010 | Clements |
| 2010/0235270 A1 | 9/2010 | Baker |
| 2011/0071859 A1 | 3/2011 | Keefer |
| 2011/0106569 A1 | 5/2011 | Price |
| 2011/0161116 A1 | 6/2011 | Peak et al. |
| 2011/0246244 A1 | 10/2011 | O'Rourke |
| 2012/0016693 A1 | 1/2012 | Haywood et al. |
| 2012/0323609 A1 | 12/2012 | Fini |
| 2014/0372150 A1* | 12/2014 | Karle ................... G06Q 40/08 705/4 |
| 2015/0103170 A1 | 4/2015 | Nelson et al. |
| 2015/0213556 A1 | 7/2015 | Haller, Jr. |

OTHER PUBLICATIONS

AIPSO 2009 Annual Report (2009).
Aleia et al., "Computer system for receiving and valuing insurance claim related to e.g. automobile, has web application server to determine probability of recovery relative to claim received from insured using log data stored in data warehouse," Derwent 2010-B63090 (Feb. 11, 2010).
Boison et al., Symbols/vehicle rating inconsistent among major insurers, MHL Actuaries & Consultants newsletter (Jul. 2002).
Cacchione et al., Using predictive modeling to reduce claims losses in auto physical damage, CAS Loss Reserve Seminar 2003, Session 3—Private Passenger Automobile Insurance (Sep. 8, 2003).
Campbell, "An integrated system for estimating the risk premium of individual car models in motor insurance," ASTIN Bulletin, vol. 16, No. 2, pp. 165-183 (1986).
Curbera et al., "Computer readable storage medium storing instructions for predictive analytics of semi-structured processes in e.g. insurance company to claim automobile insurance, has instructions to predict path from any decision node to target node", DERWENT 2012-D21024 (Sep. 10, 2010).
Frequently Asked Questions, ISO: Information About Property/Casualty Insurance Risk, Verisk Analytics (Jersey City, New Jersey) (2010).
Greenacre, "Clustering Rows and Columns", IN: *Correspondence Analysis in Practice, Second Edition*, Chapman & Hall/CRC (2007).
Greenacre, Clustering the rows and columns of a contingency table, J. Classification, 4:39-51 (1988).
IntelliDent, "What is a Supplement and Why Do Most Claims Require Them?", Intellidentpaintlessrepair.com, 2013, http://www.intellidentpaintlessrepair.com/blog/what-is-a-supplement-and-why-do-most-claims-require-them/, 3pages.
ISO and PCI Report Increased Q1 Underwriting Profits by US Property/Casualty Insurers, Collision Week (Jun. 30, 2006).
Mahoney, J., "Supplements: One Way to Understand Them", Examiner.com, 2009, http://www.examiner.com/article/supplements-one-way-to-understand-them, 2 pages.
Mitchell, "Mitchell Opens Technical Research Center to Address Next-Generation Automotive Industry Needs", Mitchell.com, 2014, http://www.mitchell.com/media-center/press-releases/2013/mitchell-opens-technical-research-center-apd.asp, 4 pages.
PR Newswire, "Toyota and Mitchell Partner to Provide Breakthrough Estimating Tool for the Collision Repair Industry", PRNewswire.com, 2013, http://www.prnewswire.com/news-releases/toyota-and-mitchell-partner-to-provide-breakthrough-estimating-tool-for-the-collision-repair-industry-230510691.html, 2 pages.
Stockburger, "Multiple Regression with Many Predictor Variables" from Introductory Statistics: Concepts, Models and Applications (Nov. 3, 2006): <http://web.archive.org/web/20060911050903/http://www.psychstat.missouristate.edu/multibook/mlt07.htm <http://web.archive.org/web/20060911050903/http:/www.psychstat.missouristate.edu/multibook/mlt07.htm>.
Stockburger, "Regression Models" from Introductory Statistics: Concepts, Models and Applications (Apr. 27, 2006).
U.S. Appl. No. 12/792,104, filed Jun. 2, 2010.
Office Action in U.S. Appl. No. 14/218,165 dated Jul. 10, 2014.
Office Action in U.S. Appl. No. 14/218,165 dated Nov. 17, 2014.
Office Action in U.S. Appl. No. 14/218,165 dated Mar. 23, 2015.
U.S. Appl. No. 14/218,165, filed Mar. 18, 2014.
U.S. Appl. No. 14/218,148, filed Mar. 18, 2014.
U.S. Appl. No. 14/168,345, filed Jan. 30, 2014.
U.S. Appl. No. 15/016,756, filed Feb. 5, 2016.

* cited by examiner

IMAGE PROCESSING SYSTEM FOR VEHICLE DAMAGE

CROSS-REFERENCE TO RELATED APPLICATIONS

This application is a continuation-in-part of U.S. patent application Ser. No. 14/218,165, entitled "SYSTEM AND METHOD OF PREDICTING VEHICLE CLAIM INFORMATION BASED ON IMAGE ATTRIBUTES" and filed on Mar. 18, 2014, the entire disclosure of which is hereby incorporated by reference herein.

This application is related to commonly-owned U.S. patent application Ser. No. 14/218,148, entitled "SYSTEM AND METHOD OF PREDICTING VEHICLE CLAIM INFORMATION BASED ON DEFORMATION IMAGES" and filed on Mar. 18, 2014, the entire disclosure of which is hereby incorporated by reference herein. Additionally, this application is related to commonly-owned U.S. Pat. No. 8,239,220 entitled "METHOD AND APPARATUS FOR OBTAINING PHOTOGRAMMETRIC DATA TO ESTIMATE IMPACT SEVERITY," and to commonly-owned U.S. Pat. No. 8,095,391 entitled "SYSTEM AND METHOD FOR PERFORMING REINSPECTION IN INSURANCE CLAIM PROCESSING," and to commonly-owned U.S. Pat. No. 9,218,626 entitled "AUTOMATIC PREDICTION AND RECOMMENDATION OF PARTS, MATERIALS, AND SERVICES FOR VEHICLE INSURANCE CLAIM ESTIMATES AND SUPPLEMENTS," the entire disclosures of which are hereby incorporated by reference herein.

Further, this application is related to commonly-owned U.S. patent application Ser. No. 12/792,104, entitled "SYSTEMS AND METHODS OF PREDICTING VEHICLE CLAIM COST" and filed on Jun. 2, 2010; to commonly-owned U.S. patent application Ser. No. 14/168,345, entitled "SYSTEM AND METHOD OF PREDICTING A VEHICLE CLAIM SUPPLEMENT BETWEEN AN INSURANCE CARRIER AND A REPAIR FACILITY" and filed on Jan. 30, 2014; and to commonly-owned U.S. patent application Ser. No. 14/168,327, entitled "SYSTEMS AND METHODS OF PREDICTING VEHICLE CLAIM RE-INSPECTIONS" and filed on Jan. 30, 2014, the entire disclosures of which are hereby incorporated by reference herein.

Still further, this application is related to commonly-owned U.S. patent application Ser. No. 15/016,756, entitled "IMAGING PROCESSING SYSTEM FOR IDENTIFYING PARTS FOR REPAIRING A VEHICLE" and filed on Feb. 5, 2016; and to commonly-owned U.S. patent application Ser. No. 15/079,356, entitled "IMAGE PROCESSING SYSTEM FOR VEHICLE DAMAGE" and filed on Mar. 24, 2016, the entire disclosures of which are hereby incorporated by reference herein.

FIELD OF THE DISCLOSURE

The present disclosure generally relates to an image processing system and method that automatically determines replacement parts and/or other items needed for and/or corresponding to repairing the vehicle, e.g., at First Notice of Loss (FNOL) or as desired.

BACKGROUND

When an insured vehicle is damaged and a vehicle insurance claim is made, typically a representative of the insurance company or carrier (e.g., an adjustor, assessor, or other agent) assesses the damage and generates a preliminary identification of the replacement parts which may be necessary to repair the vehicle, and in some cases, an estimate of a settlement payment from the insurance company to a repair facility for repairing at least some portion of the damages to the vehicle using the identified possible replacement parts, e.g., a "settlement estimate" at the insurance company/repair facility interface. This preliminary identification of possible replacement parts and the estimated setttlement is provided to or used by a particular repair facility that is to perform the repair work. In many cases, upon performing its own inspection of the vehicle or upon tearing down the vehicle, the particular repair facility finds additional damage that was not identified in the initial assessment provided by the insurance carrier, as, for example, the repair facility is able to further access the vehicle and perform a more thorough examination than could an adjustor who generally writes estimates based only on damages he or she can see, discern, or identify first-hand. When damages and/or costs that were not indicated in the preliminary assessment are discovered, the repair facility may identify additional and/or alternate replacement parts that are needed to repair the damaged vehicle, and may request an additional monetary amount or a "supplement" from the insurance carrier corresponding to the newly identified damages and/or costs.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In an embodiment, an image processing system includes a network interface via which a plurality of images of a damaged vehicle is received, and an image attribute extraction component that is configured to generate, using the plurality of images of the damaged vehicle, a set of image attributes that is indicative of a content of at least some of the plurality of images of the damaged vehicle. The set of image attributes includes one or more image attribute types, and respective values of the one or more image attribute types, for example. The image processing system includes a parts identifier component that is configured to generate, based on the set of image attributes indicative of the damaged vehicle and an information identification model, respective indications of one or more replacement parts that are needed to repair the damaged vehicle. The system also includes an output interface via which the generated, respective indications of the one or more replacement parts are provided to at least one of the network interface or a user interface.

Additionally, the image processing system includes one or more data storage devices comprising non-transitory, tangible computer-readable media storing thereon historical claim data of a plurality of historical vehicle insurance claims, and an access mechanism to the historical claim data. The historical claim data includes a plurality of claim attributes that include image attribute data of the plurality of historical vehicle insurance claims, respective indications of actual replacement parts of the plurality of historical vehicle insurance claims, and a plurality of other claim attributes of the plurality of historical vehicle insurance claims, for example. Further, the image processing system includes a model generation component that is configured to utilize the access mechanism to access the historical claim data; perform a regression analysis on the accessed historical claim data to determine a subset of a plurality of image attributes that are more strongly correlated to actual replacement parts corresponding to the plurality of historical vehicle insurance claims than are other attributes of the plurality of claim attributes; create the information identification model, where the information identification model has one or more independent variables corresponding to the subset of the plurality of image attributes that are more strongly correlated to the actual replacement parts corresponding to the plurality of historical vehicle insurance claims than are the other attributes of the plurality of claim attributes; and store the created information identification model at the one or more data storage devices or another one or more data storage devices.

In an embodiment, a method includes creating and storing an information identification model that has one or more independent variables corresponding to a subset of a plurality of image attributes that are more strongly correlated to actual replacement parts corresponding to a plurality of historical vehicle insurance claims than are other claim attributes of the plurality of historical vehicle insurance claims. The method also includes obtaining a plurality of images of a damaged vehicle and generating a set of image attributes of the obtained images, where the generation of the set of image attributes includes at least one of detecting one or more features within the plurality of images, transforming at least one image of the plurality of images, filtering the at least one image or another image of the plurality of images, or calculating one or more metrics for at least one feature, color, texture, or contrast property within the plurality of images. Additionally, the method includes generating, based on the set of image attributes and the stored information identification model, respective indications of one or more replacement parts that are needed to repair the damaged vehicle, and providing the generated, respective indications of the one or more replacement parts needed to repair the damaged vehicle to a recipient. At least a portion of the method may be performed by an image processing system, such as an embodiment of the image processing system described herein, or another image processing system, for example.

DETAILED DESCRIPTION

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents. As used herein, the term "vehicle" may include a car, an automobile, a motorcycle, a truck, a recreational vehicle, a van, a bus, a boat or other amphibious vessel, heavy equipment, or any other insurable mode of transportation.

Figure 1:
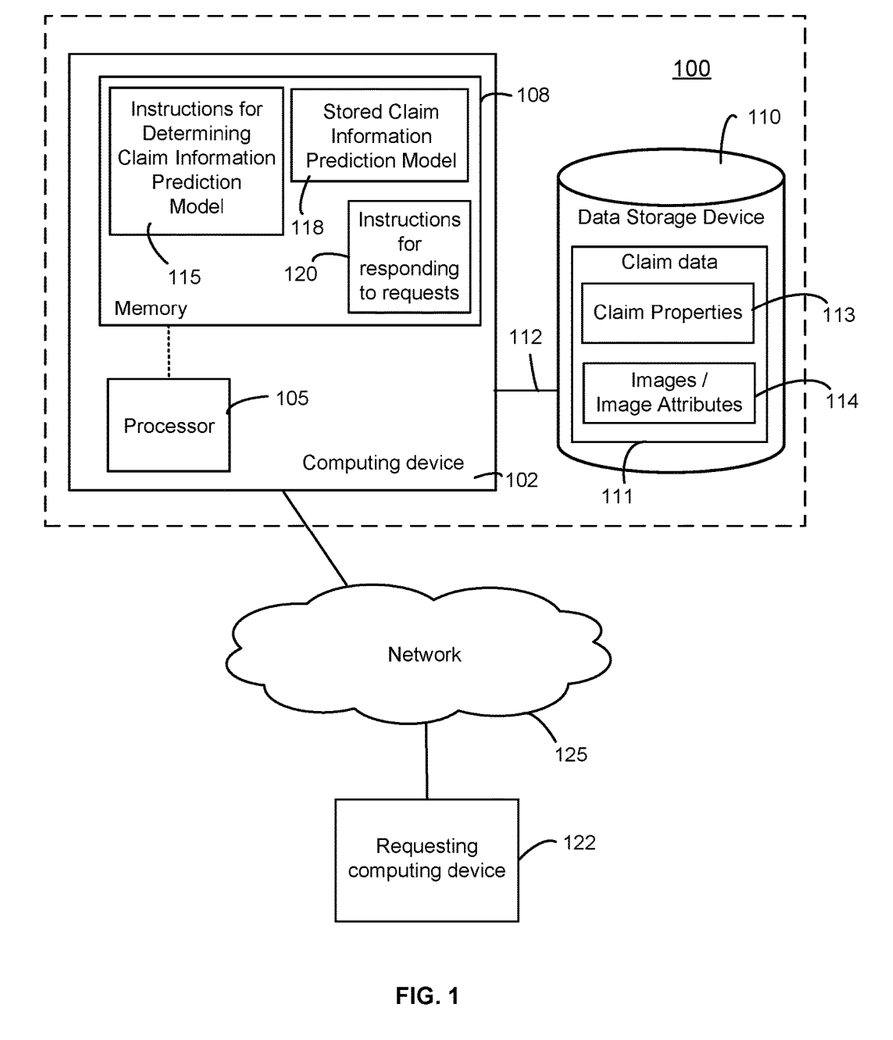
FIG. 1 is a block diagram of an exemplary system for processing images of a damaged vehicle to determine or identify information corresponding to repairing the damaged vehicle, such as replacement parts and/or other items or information.

FIG. 1 is a block diagram of an exemplary system 100 for processing images of a damaged vehicle to predict, determine, identify, and/or generate vehicle insurance claim information, such as replacement parts and/or other items or information corresponding to repairing the damaged vehicle. In an embodiment, the predicted, determined, identified, and/or generated information responding to repairing the damage to the vehicle may be generated or created during the process of resolving an insurance claim for the vehicle, or as desired (e.g., without being associated with any insurance claim). As such, "vehicle insurance claim information" or "vehicle claim information," as interchangeably used herein, generally refers to information that is or may be generated during and at the final resolution of a vehicle claims resolution process. For example, vehicle claim information may include indications of replacement parts that are needed to repair the vehicle as well as other resources are needed for otherwise utilized in the process of repairing vehicle, such as types of labor, labor costs, paint costs, towing costs, hazardous waste disposal costs, and the like.

Other examples of vehicle claim information include one or more types of amounts (e.g., monetary amounts expressed in units of currency or as a percentage) that may be generated at various stages of resolving a vehicle insurance claim. An example of a type of amount that may be predicted by the system 100 is a settlement amount between a repair facility and an insurance carrier providing the insurance policy covering the damaged vehicle, where the settlement amount is a monetary amount to be paid by the insurance carrier to the repair facility for repairing at least some of the damage to the vehicle. Another example of a type of amount that may be predicted, determined, and/or generated by the system 100 is a supplement amount to an estimate of a settlement between the insurance carrier and the repair facility. In this example, the supplement amount is an additional monetary amount corresponding to additional costs of repairing the vehicle that were not indicated with the estimate of the settlement. The settlement estimate may have been automatically predicted or provided by the system 100, or the settlement estimate may have been provided by another source. The supplement amount may be expressed in units of currency, for example, or the supplement amount may be expressed as a percentage of the settlement estimate. Yet other examples of types of vehicle insurance claim amounts which may be predicted by the system 100 include a settlement amount between the insurance carrier and an insured party and a cost of parts and/or of labor needed to repair the vehicle, e.g., to a defined level of quality. Generally, any one or more monetary amounts associated with resolving a vehicle insurance claim may be predicted, determined, identified, and/or generated by the system 100.

Vehicle claim information that is able to be predicted, determined, identified, and/or generated by the system 100 may additionally or alternatively include one or more types of scores that are generated during the process of resolving and finalizing a vehicle insurance claim. An example of a score that may be predicted by the system 100 is a supplement score indicative of a probability of an occurrence of a non-zero supplement amount for the vehicle insurance claim. Other examples of predictable scores include a re-inspection score indicative of a probability of an occurrence of a re-inspection of any or all portions of the vehicle insurance claim, and a customer service indicators (CSI) or customer satisfaction score provided by a customer (e.g., an insured party) during any step of the claim resolution process. Generally, any type of score associated with a probability of an event occurring during the resolution process of a vehicle insurance claim and/or associated with customer feedback generated during the resolution process of a vehicle insurance claim may be predicted, determined, and/or generated by the system 100.

The system 100 for processing one or more images of a damaged vehicle and predicting, determining, identifying, and/or generating vehicle insurance claim information (such as replacement parts, other items, and/or other information corresponding to repairing the damaged vehicle) based on the processed images includes a particularly configured an particularly connected computing device 102, which for the sake of illustrating the principles described herein is shown in a simplified block diagram of a computer. However, such principles apply equally to other particularly configured and particularly connected electronic devices, including, but not limited to, cellular telephones, personal digital assistants, wireless devices, laptops, cameras, tablets, smart phones or devices, media players, appliances, gaming systems, entertainment systems, set top boxes, and automotive dashboard electronics, to name a few. In some embodiments, the computing device 102 may be a server or a network of computing devices, such as a public, private, peer-to-peer, cloud computing or other known network.

The computing device 102 includes at least one processor 105 and at least one non-transitory, tangible computer-readable storage media or device 108, such as a memory. The computing device 102 may be a single computing device 102, or may be a plurality of networked computing devices. In some cases, the computing device 102 is associated with an insurance carrier. In some cases, the computing device 102 is associated with a repair facility. In some cases, the computing device 102 is associated with a third party that is not an insurance carrier (e.g., does not directly sell or issue insurance policies) and that is not a repair facility (e.g., does not perform vehicle repairs), and may or may not be in communicative connection with a computing device associated with the insurance carrier and/or with a computing device associated with a repair facility.

As shown in FIG. 1, the computing device 102 is operatively connected to a data storage device 110 via a link 112. The data storage device 110 may comprise non-transitory, tangible computer-readable storage media, such as, but not limited to RAM (Random Access Memory), ROM (Read Only Memory), EEPROM (Electrically Erasable Programmable Read-Only Memory), flash memory or other memory technology, CD (Compact Disc)-ROM, digital versatile disks (DVD) or other optical disk storage, magnetic cassettes, magnetic tape, magnetic disk storage or other magnetic storage devices, biological memories or data storage devices, or any other medium which can be used to store desired information and which can be accessed. The data storage device 110 may be a single storage device, or may be one or more networked data storage devices having a unitary logical appearance, such as a databank, cloud storage, or other physical, non-transitory data storage media. Although FIG. 1 illustrates the data storage device 110 as being separate from the computing device 102, in some embodiments the data storage entity 110 may be contained within the same physical entity as the computing device 102. The link 112 may be as simple as a memory access function, or it may be a wired, wireless, or multi-stage connection through a network. Many types of links are known in the art of networking and may be contemplated for use in the system 100.

The data storage device 110 includes or stores claim data 111, such as claim data related to historical vehicle insurance claims from one or more insurance companies or carriers, and/or from other sources such as repair shops, body shops, accident report databases, etc. Each data point in the claim data 111 corresponds to a particular historical vehicle insurance claim and includes one or more types of information 113, 114 corresponding to the claim, such as replacement parts, labor types and labor costs, a final claim settlement amount, amounts and/or scores generated during various stages of claims resolution process, vehicle owner or insured information, information regarding the accident or incident resulting in the claim, vehicle attribute information (e.g., make, model, odometer reading, etc.), towing costs, hazardous material disposal costs, paint costs, tire costs, labor hours, and/or other information corresponding to repairing the subject damaged vehicle. The different types of information or data 113, 114 that are stored for a vehicle insurance claim are generally referred to interchangeably herein as "vehicle insurance claim attributes," "vehicle claim attributes," "vehicle claim parameters," "claim attributes," "claim parameters," or "claim data types."

One type of claim attribute that is included in at least some of the claim data points 111 is image data 114 of one or more images (e.g., digital images) of vehicle damage corresponding to at least some of the historical vehicle insurance claims from one or more insurance companies or carriers. For example, the image data 114 includes historical images of vehicle damage related to a plurality of vehicle insurance claims of a plurality of insurance companies or carriers. The historical images may be captured by an adjuster traveling to a damaged vehicle, wherever it is located, and documenting the damage to the vehicle with images or photographs of the vehicle and, in particular, of the damaged portions of the vehicle. In an implementation, an adjuster, customer, or other party may utilize a vehicle image capture and labeling system to capture vehicle photos, pictures, and/or images that are automatically labeled, i.e., annotated, such as described in co-pending U.S. patent application Ser. No. 14/052,629 entitled "IMAGE CAPTURING AND AUTOMATIC LABELING SYSTEM," and filed on Oct. 11, 2013, the entire disclosure of which is hereby incorporated by reference herein.

In some implementations, the image data 114 may additionally or alternatively include image attribute vectors or other suitable format (e.g., arrays, data file, etc.) for representing the content within or of images of damaged vehicles, rather than, or in addition to, storing the images themselves. "Content" of images may include, for example, a target subject of an image (e.g., a damaged vehicle), one or more objects depicted in an image (e.g., portions of a vehicle or surroundings of a vehicle), or any other visual representations within an image. For ease of discussion, such visual representations within an image are generally referred to herein as the "content" of an image. As such, generally speaking, while an image attribute vector may be indicative and/or descriptive of at least some of the content included within the actual images, the image attribute vector may require less storage space than the space needed to store the actual image content that the image attribute vector represents. Additionally, it is noted that for ease of discussion herein, such compressed or smaller representations of image content are generally referred to as "image attribute vectors," although it is understood that formats other than vectors may be utilized to store data indicative of the content of images (e.g., image attribute types and their corresponding values within the images). For example, other formats for storing image data 114 may include arrays, data files, metadata, and the like, and the image data 114 may include one or more other formats. Further, some or all of the techniques discussed herein may apply to such other formats for storing image data 114.

An image attribute vector may include a plurality of image attribute values (e.g., discrete or continuous numerical values) for a plurality of image attribute types that are indicative of at least a portion of the content of an image. By way of example and without limitation, image attribute vectors may include image attribute types corresponding to indications of location of image features (e.g., point, edge, corner, or ridge features), dimensions of image features (e.g., length, width, or radius), colors of points or areas in an image, textures of points or areas in an image, entropies of an image, contrasts of an image, lighting orientations, locations or properties of shadows in an image, etc.

In some implementations, the image data 114 may include image attribute values separate from (e.g., that are not included in) any image attribute vector. For example, the image data 114 may include a record of a color image attribute that is representative of the color of at least a part of the content of an image, where the value of the color image attribute is not included in any image attribute vector, e.g., is separate from any other image attributes forming an image attribute vector. Further, it is clear that the image data 114 may include any suitable combination of images, image attribute vectors, and image attribute values indicative of one or more historical images of damage to a vehicle.

In addition to image data 114, data in the claim data 111 corresponding to a particular historical vehicle insurance claim may also include a plurality of other claim properties or attribute types/values 113, such as a final claim settlement amount, other amounts and/or scores associated with the claim, vehicle owner or insured information, information regarding the accident or incident resulting in the claim, and vehicle information (e.g., make, model, odometer reading, etc.). The plurality of other claim properties 113 may also include customer service indicators (CSIs) or customer satisfaction scores of a respective vehicle insurance claim. A claim data point corresponding to a particular vehicle insurance claim may include one CSI associated with the claim, or may include multiple CSIs indicative of multiple feedback points during the claims resolution process, e.g., a CSI for the overall claims resolution process, another CSI for the repair facility, a another CSI for the insurance carrier interface, etc. CSIs may be scaled across the claim data 111.

Further, each particular data point of the historical claim data 111 may correspond to a partial or a total loss claim. For a partial loss claim, typically the vehicle was repaired by one or more repair facilities, and thus the corresponding data point may include claim attributes or properties corresponding to an initial repair estimate, a final settlement amount between the insurance company and one of the repair facilities, types and costs of replacement parts, labor costs, a location of the repair facility, and the like. Other types of claim attributes or properties that may be included for a partial loss claim are an indication as to whether or not a supplement was generated for the claim, and if a supplement was generated, the monetary amount of the supplement. The claim data point may include one or more claim attributes corresponding to an indication of whether or not a re-inspection occurred for the claim, and if a re-inspection did occur, the cost of performing the re-inspection (e.g., cost to the insurance carrier and/or cost to the repair facility). Additionally, the claim data point may include one or more claim attributes or properties corresponding to/indicative of the differential between an estimate that occurred after the re-inspection and an estimate performed prior to the re-inspection (e.g., an estimate performed at First Notice of Loss (FNOL) or other estimate). For a total loss claim, such as when a vehicle was stolen or was totaled, the corresponding data point may include claim attributes or properties corresponding to/indicative of a location of vehicle loss and an amount of a payment from the insurance carrier to the insured.

A list of types of claim data information, parameters, attributes, or properties, that may be included in the claim follows:

Insurance policy number
Insurance company or carrier holding the insurance policy
Identification of insured party
Vehicle owner name; street, city and state address; zip code
Location (e.g., state and zip code) where vehicle loss occurred
Zip code where vehicle is garaged
Vehicle driver name; age; street, city and state address; zip code
Vehicle Identification Number (VIN)
Vehicle make, model, model year, country of origin, manufacturer
Vehicle type or body style (e.g., sedan, coupe, pick-up, SUV, wagon, van, hatchback, convertible, etc.)
Vehicle odometer reading
Vehicle engine size, color, number of doors
Whether or not the vehicle is leased
Age of vehicle
Condition of vehicle
Settlement amount between insurance company and repair facility
Payout amount (if any) to insured party or party holding the insurance policy
Loss date
Vehicle appraisal inspection location and responsible adjustor
Primary and secondary point of impact
Vehicle drivable condition
Airbag deploy condition
Qualitative severity of damage
Quantitative severity of damage
Velocity of vehicle just prior to impact
Change in velocity of vehicle due to impact
Vehicle dimension score
Vehicle repair score
Initial estimate
Estimate or prediction of settlement at FNOL
Estimate from another repair facility or party
One or more additional estimates and indications of when during the claim settlement process the additional estimates occurred
Occurrence of one or more re-inspections
Cost to perform each re-inspection
Revised estimate after re-inspection and corresponding repair work/parts
Occurrence of one or more supplements paid from insurance company to repair facility
Monetary amount of each supplement
Level of desired target quality of repair
Level of actual quality of repair
Deductible
Towing and storage costs Labor hours and costs for replacement and/or repair, and Type of labor (e.g., sheet metal, mechanical, refinish, frame, paint, structural, diagnostic, electrical, glass, etc.)

Type of replacement part (e.g., OEM (Original Equipment Manufactured), new, recycled, reconditioned, etc.)

Cost of replacement part

Paint costs

Tire costs

Hazardous waste disposal costs

Repair facility name, location, state, zip code

Drivability indicator

As illustrated in the above, some of the claim attributes, parameters, or properties 113, 114 of claim data points 111 are vehicle parameters that are indicative of a vehicle. Some claim attributes, parameters, or properties are indicative of a driver, an owner, or an insured party of the vehicle, and some claim parameters or properties 113, 114 may pertain to the insurance policy itself and/or to the resolution of the claim. Some claim attributes, parameters, or properties 113, 114 are indicative of the impact, collision or damage-causing incident. It is understood that not every vehicle claim in the claim data 111 is required to include every claim attribute, parameter, or property in the list above. Indeed, some data points or vehicle claims in the claim data 111 may include claim attributes, parameters, or properties that are not on the list.

Turning back to FIG. 1, the memory 108 of the computing device 102 comprises non-transitory, tangible computer-readable storage media, such as, but not limited to RAM (Random Access Memory), ROM (Read Only Memory), EEPROM (Electrically Erasable Programmable Read-Only Memory), flash memory or other memory technology, CD (Compact Disc)-ROM, digital versatile disks (DVD) or other optical disk storage, magnetic cassettes, magnetic tape, magnetic disk storage or other magnetic storage devices, biological memories or data storage devices, or any other medium which can be used to store desired information and which can be accessed by the processor 105. In some embodiments, the memory 108 comprises more than one computer-readable storage media device and/or device type.

The memory 108 includes computer-executable instructions 115 stored thereon for determining an information prediction model 118, which is also referred to interchangeably herein as an information identification model 118, information model 118, or model 118. Generally, the information model 118 includes one or more independent variables, one or more dependent variables, and one or more mappings between values of the one or more independent and dependent variables. In the system 100, the one or more independent variables that are input into the information prediction model 118 to determine values of the dependent variables include at least some image attributes corresponding to images of a subject vehicle, and optionally may include other vehicle claim attributes, parameters, or properties. The dependent variables of the information prediction model 118 may include one or more variables corresponding to predictions, determinations, identifications, and/or generations of indications of replacement parts, materials, other items, labor types, labor costs, amounts, scores, and/or other information that may be generated during a claims resolution process for a vehicle insurance claim, and/or other information corresponding to repairing a subject damaged vehicle.

To determine the information prediction model 118 including the one or more independent variables, the one or more dependent variables, and the one or more mappings between dependent and independent variables included therein, the computer-executable instructions 115 include instructions for obtaining claim data 111 corresponding to a plurality of historical vehicle insurance claims (e.g., vehicle insurance claims that have been made and settled) from the data storage device 110. The historical claim data 111 includes at least some of the parameters, attributes, and/or claim properties listed above, and/or may include other claim parameters, attributes, and/or properties. In particular, the historical claim data 111 may include, for a plurality of historical vehicle claims, image data, such as digital images, image attribute vectors, and/or image attribute values, actual vehicle claim information (e.g., actual amounts and/or scores for historical vehicle insurance claims), and a plurality of other claim attributes, parameters, and/or properties. Obtaining the claim data 111 from the data storage device 110 may include performing a database read or some other database access function, or may include initiating a message exchange between the computing device 102 and the data storage device 110, or some other access mechanism. In some embodiments, obtaining the claim data 111 may include obtaining all claim attribute, parameter, and/or property values for a particular historical vehicle insurance claim. In some embodiments, obtaining the claim data may include obtaining a subset of all attribute, parameter, and/or claim property values that are available for the particular historical vehicle insurance claim.

The computer-executable instructions 115 for determining the information model 118 include instructions for performing a data analysis on the obtained claim data 111 to determine a subset of the plurality of claim attributes, parameters, and/properties and/or image attributes that are most closely correlated to vehicle claim information (e.g., to replacement parts, other items, labor types, labor costs, paint costs, replacement parts types, amounts, scores, costs, other information that is or may be generated during the claims resolution process, and/or other information that is needed for and/or corresponds to repairing a damaged vehicle) across the claim data 111, for example. In some cases, the types of vehicle claim information that are desired to be determined, identified, generated, and/or predicted may be selected or otherwise indicated. A single type of vehicle claim information may be selected or indicated, or multiple types of vehicle claim information that is desired to be determined, identified, generated, and/or predicted may be selected or indicated. Additionally, the data analysis performed on the obtained claim data 111 may be, for example, a linear regression analysis, a multivariate regression analysis such as the Ordinary Least Squares algorithm, a logistic regression analysis, a K-th nearest neighbor (k-NN) analysis, a K-means analysis, a Naïve Bayes analysis, another suitable or desired predictive data analysis, one or more machine learning algorithms, or some combination thereof.

The subset of the plurality of attributes or parameters that are most closely correlated to the desired type(s) of actual vehicle claim information across the claim data 111 are identified as the independent variables of the information model 118. In an embodiment, at least some image attribute types are independent variables of the information prediction model 118. For example, the data analysis may determine that the certain types or locations of image features are independent variables of the model 118 (e.g., location of one or more edges in an image, radius of a point feature in an image, or color of one or more areas within an image). Additionally or alternatively, in some situations, the data analysis may determine that one or more other claim attributes or properties are independent variables of the information model 118 (e.g., a year of manufacture of the subject vehicle, or a length of time that the policy has been in force).

In some embodiments, the instructions 115 for determining an information model 118 include instructions for determining a weighting of independent variables commensurate with the strength of their respective correlation to one or more dependent variables. In these embodiments, the instructions 115 identify, determine, generate, and/or predict the vehicle claim information based on the weighting of values of the independent variables for the particular vehicle insurance claim. For example, to predict a customer service indicator score, the instructions 120 may give priority to fitting a detected image attribute indicative of an edge feature to independent variable values (or ranges thereof) over fitting a detected image attribute indicative of color, if an edge feature is found (via the data analysis) to be more strongly correlated to the CSI than is a color image attribute.

A total number of independent variables of the model 118 may be configurable or selectable. For example, the total number of independent variables may be limited to include only parameters that have a t-statistic greater than a certain threshold, where the t-statistic is a measure of how strongly a particular independent variable (e.g., image attribute) explains variations in a dependent variable. Additionally or alternatively, the total number of independent variables may be limited to include parameters that have a P-value lower than another threshold, where the P-value corresponds to a probability that a given independent variable is statistically unrelated to a dependent variable.

Still further, the total number of independent variables of the model 118 may be additionally or alternatively limited based on an F-statistic, where the F-statistic evaluates an overall statistical quality of the information prediction model 118 with multiple independent variables. For example, all of the determined independent variables may be initially included in the information prediction model 118, and those independent variables with lower t-statistics may be gradually eliminated until the F-statistic for the information prediction model 118 increases to a desired level. Of course, the number of independent variables may be additionally or alternatively configured based on other statistical or non-statistical criteria as well, such as user input.

The computer-executable instructions 115 include instructions for determining the one or more mappings between values of the independent variables and the dependent variables of the information prediction model 118. For example, values (or ranges thereof) of the parameters or attributes determined to be independent variables may be mapped to values (or ranges thereof) of predicted amounts or scores of a vehicle insurance claim. In some embodiments, different values or ranges of values of the independent variables may be grouped or segmented for manageability purposes.

In some embodiments of the system 100, the instructions 115 for determining the information prediction model 118 include instructions for performing a cluster analysis on the claim data 111 prior to performing the data analysis. A cluster analysis may be performed to whittle the plethora of candidate independent variables represented within the claim data 111 down to a manageable or desired number of clusters, so that a similarity between data points (e.g., particular images, image attribute vectors, image attribute values, and/or claim properties) within a cluster is maximized and a similarity between various clusters is minimized. For example, a clustering of vehicle insurance claims based on image attribute vector similarities may be performed, resulting in sets of vehicle insurance claims clusters having similar image attribute vectors (e.g., similar detected features, colors, and textures) or having similar image attribute patterns (e.g., similar ratios or correlations between image attribute values). In another example, a cluster analysis of claims included in the claim data 111 based on an average actual settlement cost may be performed, resulting in a set of clusters of vehicle insurance claims where the claims in each cluster are most closely interrelated based on average actual settlement cost. Other example of clustering based on other claim properties may be possible. The cluster analysis may be performed by any known clustering algorithm or method, such as hierarchical clustering, disjoint clustering, the Greenacre method (e.g., as described in Greenacre, M. J. (1988), "Clustering Rows and Columns of a Contingency Table," Journal of Classification, 5, pp. 39-51), or portions, variations or combinations thereof.

The number of clusters obtained from a cluster analysis may be configurable or selectable. For example, a desired number of clusters may be based on user input. Additionally or alternatively, the desired number of clusters may be based on a desired level of similarity or dissimilarity between clusters. Other bases for configuring the number of clusters are also possible.

After the information prediction model 118 (including independent variables, dependent variables, and mappings) is determined by the instructions 115, the computing device 102 may store the information prediction model 118 in the memory 108. Alternatively or additionally, the computing device 102 may store some or all portions of the information prediction model 118 in the data storage device 110.

In FIG. 1, the memory 108 includes further computer-executable instructions 120 stored thereon for receiving a request to predict, identify, generate, and/or determine vehicle claim attribute information for a particular vehicle. For example, the particular vehicle may be associated with a particular insurance claim for the particular vehicle, e.g., for a new claim or for a claim that is not included in the historical claim data 111. In another example, the particular vehicle may not be associated with any vehicle insurance claim, such as when a vehicle owner merely desires to repair the vehicle without informing his or her insurance carrier. At any rate, in an embodiment, the computer-executable instructions 120 may be configured to receive and process the request to predict, identify, determine, and/or generate respective indications of one or more replacement parts, materials, other items, labor types, labor costs, and/or other values of parameters corresponding to repairing a subject damaged vehicle, which may or may not correspond to a vehicle insurance claim. In some embodiments (not shown), the computer-executable instructions 115 and 120 may both be included in a single set of instructions, but in FIG. 1 they are shown as separate entities 115, 120 for clarity of discussion.

Additionally, in FIG. 1, the requesting entity is illustrated as being a requesting computing device 122, but this is only exemplary, as the requesting entity may be another type of entity such as a human who interacts with the system 100 via a local or remote user interface or an application executing on the computing device 102, the computing device 122, or another computing device. In FIG. 1, the requesting computing device 122 is communicatively coupled to the computing device 102 via a network 125. The network 125 may be, for example, a private local area network, a wide area network, a peer-to-peer network, a cloud computing network, the Internet, a wired or wireless network, or any combination of one or more known public and/or private networks that enable communication between the computing devices 122 and 102. In some embodiments, the network 125 may be omitted, such as when the computing device 122 and the computing device 102 are directly connected or are an integral computing device.

In some scenarios, the requesting computing device 122 may be a tablet, laptop, smart device, server, or other computing device that is associated with, owned or operated by the insurance company. For example, the requesting computing device 122 may be a tablet, laptop, or smart device used by a field assessor while the assessor is at a field site inspecting vehicle damage, e.g., at FNOL. In another example, the requesting computing device 122 may be a back-end computing server or network of computing devices of the insurance company that processes all incoming claims, or the requesting computing device 122 may be a host of a website that agents of the insurance company are able to access via a browser.

In some scenarios, the requesting computing device 122 may be a tablet, laptop, smart device, server, or other computing device associated with, owned or operated by the repair facility. For example, the requesting computing device 122 may be a tablet, laptop, smart device, or desktop computing device located at the repair facility that is used to track customers and repairs to their vehicles. In another example, the requesting computing device 122 may be a computing server or network of computing devices at a back-end office of an owning company of the repair facility that processes vehicle repair work orders related to insurance claims for many repair facilities.

Returning to the memory 108, the further computer-executable instructions 120 stored thereon are executable to receive the request for predicting, identifying, determining, and/or generating vehicle claim information such as replacement parts and/or other information. In some scenarios, the request includes an indication of a type of vehicle claim information that is requested or desired to be predicted, identified, determined, and/or generated, e.g., replacement parts, items, and/or other resources needed to repair the subject vehicle, a settlement amount between the insurance carrier and a repair facility, a settlement amount between the insurance carrier and an insured party, a probability of a re-inspection, a CSI score, other types of amounts, scores, and/or other information that may be generated during a claims resolution process for vehicle insurance claim, and/or other information/values of parameters corresponding to repairing the subject vehicle, such as those discussed above.

In some scenarios, the request received at the system 100 includes or indicates one or more images of the damaged vehicle, which may be indicative or descriptive of the damage to the vehicle. That is, the content of the images depicts damage to the vehicle via target subjects of the images, objects depicted in the images, etc. The images of the damage to the vehicle may be represented in any suitable bitmap or vector format, such as Joint Photographic Experts Group (JPEG), Graphics Interchange Format (GIF), Portable Networks Graphics (PNG), Portable Document Format (PDF), or Encapsulated Postscript (EPS), for example.

The computing device 102 may execute the computer-executable instructions 120 to extract, determine, create, and/or or generate one or more image attribute vectors and/or image attribute values based on and corresponding to images indicated by on included with the request. The creation of one or more image attribute vectors and/or values for the received images may include an application of any suitable combination of feature detection techniques, filters, transformations, statistical measure calculations, etc., as further discussed with reference to FIG. 2 below.

Image attribute vectors (e.g., generated via execution of the computer-executable instructions 120) may, in an implementation, include a plurality of numerical, symbolic, and/or textual values corresponding to a plurality of types of image attributes (e.g., image attribute values). An example image attribute vector may include one or more numeric values indicative of locations and/or dimensions of features (edges, corners, points, etc.) within an image and one or more textual and numeric indications of colors, contrasts, and textures within an image (statistical measures of color, contrast, and texture within an image). In this manner, an image attribute vector may be indicative of the content of an image, while remaining less data, memory, and/or processing intensive than the image itself.

In some implementations, an adjuster or computing device may tag or label the images of damage to the vehicle when the images are captured, such that a computing device or individual examining the images may more easily deduce certain image information. The image information may include, by way of example, portions of the vehicle included in an image (passenger-side left, front, back, drivers-side back, etc.), a timestamp representing when the image was captured, an identification of the vehicle (license plate, insurance claim policy number, VIN number, etc.). In some cases, such tags, labels, or other annotations may be included in an image attribute vector.

Additionally, in some cases, the request for the vehicle claim information includes one or more values corresponding to one or more other claim attributes, parameters, and/or properties of vehicle insurance claims, e.g., parameters corresponding to the insurance policy covering the damaged vehicle (e.g., deductible, identifications of authorized repair facilities, etc.); data specific to the particular vehicle, such as a VIN (Vehicle Identification Number); a desired level of repair quality; and/or other data indicative of attributes of vehicle insurance claims. One or more of these other received claim attribute, parameter, and/or property values may be utilized to predict, identify, determine, and/or generate the requested vehicle claim information, or none of the other received claim attribute, parameter, and/or property values may be utilized.

Furthermore, it is noted that the request received by the system 100 may take any known form, such as a message, a data transfer, a web-service call, or some other action taken by an application or function.

From the specific claim and image data included in or indicated by the request, the instructions 120 determine the values for some or all of the independent variables of the information prediction model 118, and provide at least some of the values as inputs to the information prediction model 118. When a request does not reference valid values for all independent variables of the information prediction model 118, the instructions 120 may attempt to provide a best fit. For example, the instructions 120 may ignore independent variables for which no or an invalid value was provided in the request, or the instructions 120 may assign a default value for those independent variables. In some cases, particular image attribute vectors, values or claim properties may be provided as inputs to the information prediction model 118 irrespective of whether or not they are independent variables of the information prediction model 118.

The computer-executable instructions 120 may determine, predict, identify, and/or generate vehicle claim information (e.g., one or more replacement parts, labor types in cost, amounts, scores, other items and/or information that is or may be generated by resolving a vehicle insurance claim, and/or other information corresponding to repairing the subject vehicle) based on: (i) image attribute types and their respective values (which may or may not be included in a request), (ii) mappings of the information prediction model 118; and, optionally in some cases, (iii) values of other claim attributes, parameters, and/or properties (which may or may not be included in a request). For example, the computer-executable instructions 120 may cause one or more image attribute values and one or more claim attribute, parameter, and/or property values corresponding to the subject vehicle to be input into the information prediction model 118, which then may generate, as an output, one or more predicted or identified replacement parts, materials or items, labor types and costs, amounts, scores, other vehicle claim information, and/or other informational resources corresponding to repairing the subject vehicle.

In some embodiments, the information prediction model 118 stored in the system 100 is trained or updated to account for additional data (e.g., additional image attribute data) that has been added to the claim data 111. Training or updating may be triggered periodically at a given interval, such as weekly, monthly or quarterly. Training or updating may be triggered when a particular quantity of additional data points has been added to the original claim data 111. In some embodiments, prior to training, some portion of the original claim data 111 is deleted, such as older labor cost data that no longer accurately reflects labor market wages. Additionally or alternatively, training or updating may be triggered by a user request.

When a trigger to update the information model 118 is received by the system 100, the system 100 may perform some or all of the instructions 115 to re-determine at least a portion of the information prediction model 118 based on the additional claim data or a new set of claim data. The re-determination may operate on only the additional claim data, or may operate on an aggregation of one or more portions of the original claim data 111 and the additional claim data. The re-determination may include repeating some or all of the steps originally used to determine the original information prediction model 118 on the additional claim data. For example, the re-determination may include performing predictive analysis on the additional claim data to determine if the additional claim data statistically supports revising the independent variables of the information prediction model 118. In another example, the re-determination may include performing cluster analysis on the aggregation of the additional claim data and at least a portion of the original claim data. The exact set of steps to be repeated on the additional claim data may be selectable, and/or may vary based on factors such as a quantity of additional data points, time elapsed since the last update, a user indication, or other factors. The re-determination may result in an updated information prediction model 118, which then may be stored in the system 100.

Note that the information prediction model 118 generated by the system 100, and in particular, updates to the information prediction model 118 may result in more accurate potential cost estimates over time. With the system 100, the information prediction model 118 may be continually updated with additional claim data, thus ensuring a more statistically accurate reflection of identities and values of independent variables, and accordingly, a more statistically accurate prediction of an amount of a supplement.

Additionally, although FIG. 1 illustrates both the instructions for determining an information prediction model 118 and the instructions for responding to requests 120 being stored and executed by the same computing device 102, in some embodiments, the two sets of instructions 115, 120 are stored on and executed by different computing devices or systems that may be in communicative connection with each other. Further, in some scenarios, the computing device 102 is associated with, owned or operated by the insurance company that issued the policy under which the damaged vehicle is covered. For example, the computing device 102 may be a back-end server or network of computing devices of the insurance company that store and execute the instructions 120 for responding to requests (e.g., from computing devices 122 of field assessors or agents), and may be in communicative connection with another computing device (not shown) that stores and executes the instructions 115 for determining the information prediction model 118.

In some scenarios, the computing device 102 is associated with, owned or operated by the repair facility that is to repair the damaged vehicle. For example, the computing device 102 may be a back-end server or network of computing devices of an owning parent company of the repair facility that stores and execute the instructions 120 for responding to requests from multiple computing devices 122 of various repair facility store fronts or franchise locations, and may be in communicative connection with another computing device (not shown) that stores and executes the instructions 115 for determining the information prediction model 118.

In some scenarios, the computing device 102 is associated with, owned or operated by a third party that is not the insurance company that issued the policy under which the damaged vehicle is covered, and is not one of the repair facilities that is to repair the vehicle damages. For example, the computing device 102 may be associated with a company or organization that provides predictive products and resources to multiple insurance companies, repair facilities, and other companies or entities associated with repairing damages to insured vehicles.

Figure 2:
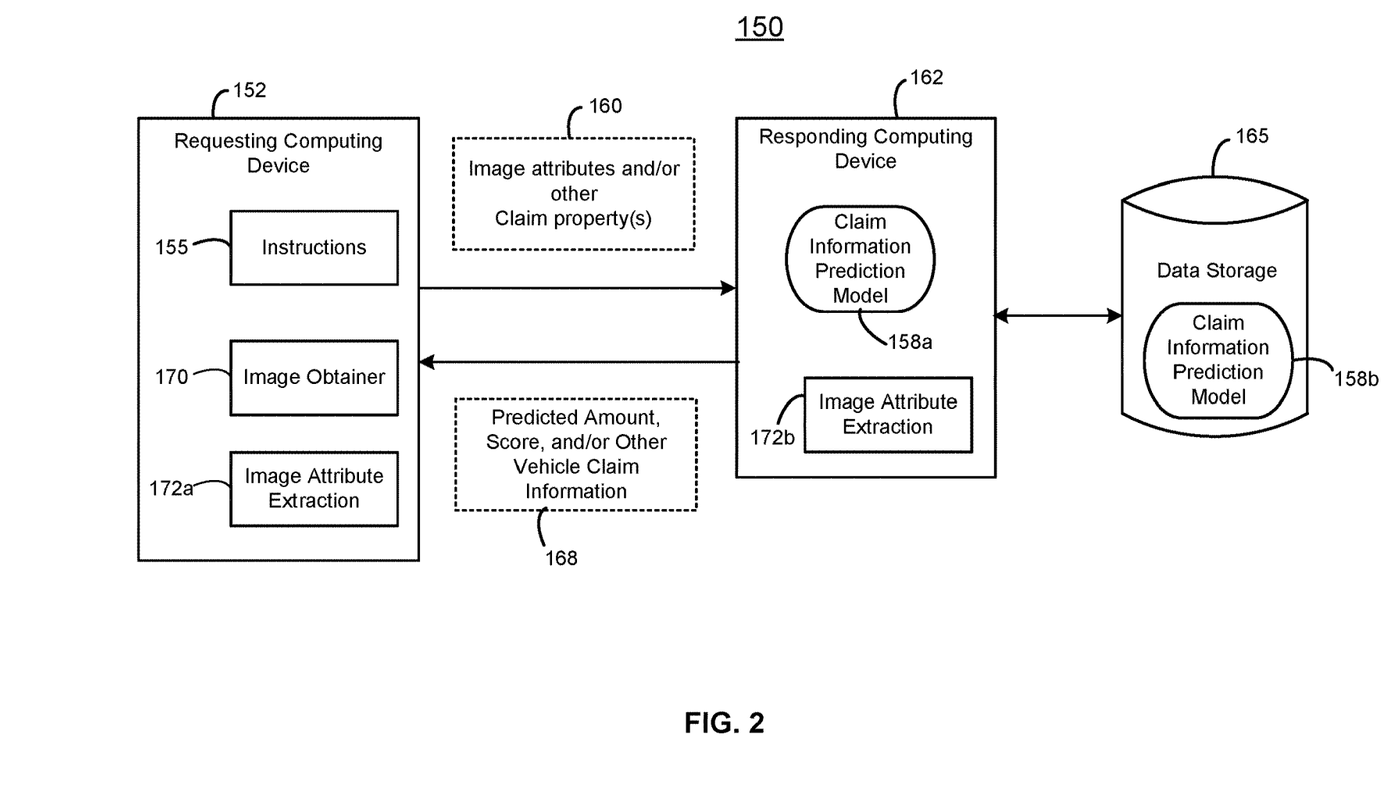
FIG. 2 is an example data flow in an exemplary image processing system configured to determine or predict, by using an information identification or prediction model, information corresponding to repairing a damaged vehicle, such as needed replacement parts.

FIG. 2 depicts an exemplary data flow in an embodiment of a system 150 that includes a computing device 152 particularly configured to predict, identify, determine, and/or generate vehicle claim information (e.g., replacement parts, replacement part types, labor types, labor costs, other costs, amounts, scores, other items, and/or other information that is or that may be generated by the process of resolving a vehicle insurance claim, and/or other information needed for and/or corresponding to repairing a damaged vehicle) based, at least partially, on detected image attributes. The computing device 152 may be a computing device with a memory, a processor, and particular computer-executable instructions 155, 170, and 172 stored on its memory and executable by its processor. The computing device 152 may operate in conjunction with embodiments of the system 100 of FIG. 1, and in some embodiments, the computing device 152 may be the requesting computing device 122 of FIG. 1.

In FIG. 2, the computing device 152 of the system 150 includes instructions 170 for obtaining plurality of images of the subject vehicle, e.g., of damaged portions of the subject vehicle. The actual plurality of images of the subject vehicle may be included in a request to predict vehicle claim information, in an implementation. Alternatively, image attributes and/or values indicative of the content of the actual plurality of images may be included in a request to predict vehicle claim information. In other implementations, a request does not include images or image attributes. Rather, the request may include references or indices that direct (or point) the instructions 170 to database records, or other data entries, that store images or image attributes (e.g., stored in the data storage device 165).

In embodiments in which a plurality of images of the subject vehicle is obtained by the computing device 152, the system 150 may include instructions 172 for performing image processing on the plurality of images to extract, determine, generate, and/or create one or more image attribute vectors corresponding to the plurality of images and indicative of their content. The image attribute processing or extraction 172 may be performed by the computing device 152 (as indicated by reference 172a), by the computing device 162 (as indicated by reference 172b), or by both computing devices 152, 162 operating together in concert. In these embodiments in which a plurality of images of the subject vehicle is obtained by the computing device 152, the plurality of images of the subject vehicle are inputs into the image attribute extraction 172, and a plurality of image attributes, or one or more image attribute vectors, may be an output of the image attribute extraction 172.

When executed by one or more processors of the computing device 152 or the computing device 162, the image attribute extraction instructions 172 may perform a feature detection. Performing a feature detection includes performing any suitable feature detection or feature extraction technique or techniques such as an edge detection, corner detection, blob detection, ridge detection, scale-invariant feature transformation, thresholding, template matching, etc. The feature detection outputs a plurality of image attributes (e.g., expressible as an image attribute vector), where the plurality of image attributes include one or more locations of features within images, sizes or dimensions of features within images, types of features within images, or intersections of features within images. In one example scenario, the feature detection detects a broken window or dent in a vehicle as a plurality of edges or ridges in an images intersecting at one or more points. The plurality of image attributes may be output from the feature detection as a vector of numbers, characters, and/or symbols.

Also, when executed by one or more processors of the computing device 152 or the computing device 162, the image attribute extraction instructions 172 may apply filters or other transformations to an image as a whole or to portions of an image to extract image attributes. In an example, the image attribute extraction 172 applies Gabor filters/functions, as known in the industry, to one or more images or portions of an image to extract scales, orientations, etc. from an image. Alternatively, the image attribute extraction 172 may utilize a wavelet filter bank, wavelet transformation, or other filter bank to extract textures from an image or a portion of an image, or the image attribute extraction 172 may transform the image into a binary color (e.g., black and white) image to detect edges or shapes within an image. In some cases, the image attribute extraction 172 applies filters, transformations, and/or other image processing techniques to detect lighting orientations or shadow locations/orientations within an image. Generally, an image attribute extraction may apply any suitable type of filters or transformations to either pre-process an image before further attribute extraction or to directly extract image attributes (e.g., output as an image attribute vector).

Still further, when executed by one or more processors of the computing device 152 or the computing device 162, the image attribute extraction instructions 172 may calculate statistical measures, gradient measures, or other metrics for an image as a whole or for portions of an image. For example, the image attribute extraction 172 may calculate a frequency of an attribute within an image, an average of an attribute within an image, a distribution of an attribute within an image, etc. The image attribute extraction 172 may calculate an average, gradient, summed, or otherwise mathematically determined color, texture, or contrast property within an image or a portion of an image, or the image attribute extraction 172 may calculate a frequency or distribution (e.g., standard deviation, mean, and median) of pixels of a certain color within an image. In an embodiment, such statistical measures or metrics are output as a plurality of image attributes (e.g., in the form of an image vector) from the image attribute extraction 172, where each of the plurality of image attributes indicates a value of the statistical measure or metric.

The instructions 172 may cause the computing device 152 to additionally or alternatively apply or perform any one or more other suitable image attribute extraction and/or image processing techniques, such as those described in commonly-owned U.S. Pat. No. 8,239,220 entitled "METHOD AND APPARATUS FOR OBTAINING PHOTOGRAMMETRIC DATA TO ESTIMATE IMPACT SEVERITY," the entire disclosure of which is hereby incorporated by reference herein, and/or other image processing techniques.

Returning to FIG. 2, the instructions 155 stored on the computing device 152 include instructions for obtaining values of image attribute vectors and, in some cases, values of claim attributes, parameters, and/or properties corresponding to a subject vehicle. The image attribute vectors, or image attribute values, may be input to the instructions 155 from the image attribute extraction 172a or may be retrieved by the instructions 155 from a data storage device record or entry indicated in the request. The values of the claim attributes, parameters, and/or properties may be obtained via a user interface, by reading from a file, by extracting from a message, or by any other known means of obtaining values. The obtained values may optionally include other values corresponding to any other claim parameter or combination of parameters, such as those included in the previously discussed list or other claim parameters.

In some embodiments, the instructions 155 additionally include instructions for obtaining a selection or indication of one or more particular types of vehicle claim information (e.g., one or more particular parts, materials, labor types, labor costs, amounts, scores, and/or other vehicle claim information) that is to be predicted, identified, determined, and/or generated based on the image attributes corresponding to the subject vehicle. For example, the selection of vehicle information type may be indicated by a user interface, in a message, by an indicator stored in a database, or by some other mechanism.

The instructions 155 in FIG. 2 further include instructions for obtaining, based on the values of the obtained image attribute vectors and/or claim attributes or parameters, and based on the information prediction model 158, predicted, determined, identified, and/or generated vehicle claim information (e.g., parts, materials, other items, costs, amounts, scores, and/or other information corresponding to the subject damaged vehicle), as determined by an information prediction model 158. As shown in FIG. 2, the information identification model 158 may be entirely stored at the computing device 162 (e.g., reference 158a), the information identification model 158 may be entirely stored at a data storage entity 165 that is accessible to the computing device 162 (e.g., reference 158b), or the information identification model 158 may be stored across both the computing device 162 and the data storage device 165 (e.g., references 158a and 158b).

In the system 150, to obtain the indication of the predicted, identified, determined, and/or generated vehicle claim information, the computing device 152 requests 160 another computing device 162 that is particularly configured to access an information prediction model 158a and/or 158b.

The requesting 152 and the responding 162 computing devices may be directly or remotely connected via one or more public and/or private networks. In some embodiments of the system 150, the requesting computing device 152 and the responding computing device 162 may have a client/server relationship. In some embodiments, the computing devices 152 and 162 may have a peer-to-peer or cloud computing relationship, or the computing devices 152 and 162 may be an integral computing device. Other relationships between the computing devices 152 and 162 are also possible. Thus, the request 160 may take any known form, such as sending a message, transferring data, or performing a web-service call.

In some embodiments, the request 160 includes values of image attributes descriptive or indicative of the damage to the vehicle. The request 160 may additionally or alternatively include values of one or more other claim attributes or properties corresponding to the damaged vehicle. In some embodiments, the values of only the image attributes that have been determined to be independent variables of the information prediction model 158a, 158b are included in the request 160.

Upon receiving the request 160, the responding computing device 162 determines, identifies, generates, and/or predicts the vehicle claim information (e.g., one or more particular parts, materials, labor types, labor costs, amounts, scores, and/or other vehicle claim information) based on the one or more image attribute values (and, in some cases, based on the claim attribute property values included in the request 160) and the information prediction model 158a, 158b. For example, one or more of the image attributes included in the request 160 are input into the information prediction model 158a, 158b. Similar to the system 100 of FIG. 1, if the request 160 omits or provides an invalid value for an image attribute or claim property that is an independent variable of the information prediction model 158a, 158b, the computing device 162 may process the request 160 based on a best fit of the provided values in the request 160. The responding computing device 162 may return an indication 168 of the identified vehicle claim information (e.g., the one or more particular parts, materials, labor types, labor costs, amounts, scores, and/or other vehicle claim information).

The requesting computing device 152 obtains the indication 168 of the identified vehicle claim information from the responding computing device 162, and may cause the indication of the identified vehicle claim information to be presented at a user interface (e.g., of the requesting computing device 152 or of another computing device). In some embodiments, the requesting computing device 152 causes the indication 168 of the identified vehicle claim information to be transmitted to another computing device.

Figure 3:
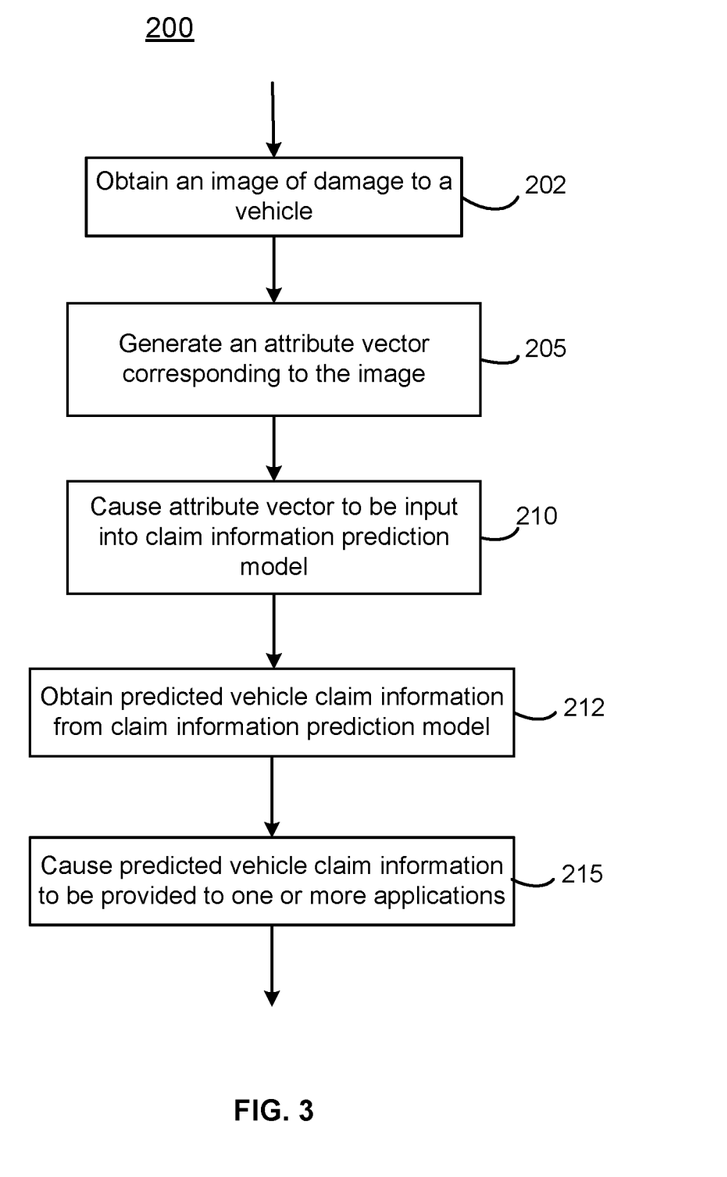
FIG. 3 illustrates an example method of predicting or determining information corresponding to repairing a damaged vehicle based on image attributes corresponding to one or more images of damage to the vehicle.

FIG. 3 is an embodiment of an example method 200 of predicting vehicle claim information, such as replacement parts which are needed to repair a damaged vehicle, based on processing images of the damage to the vehicle. Embodiments of the method 200 may be used in conjunction with one or more of the systems of FIGS. 1 and 2, and with the previously discussed list of possible claim attributes, properties, and/or parameters, and/or with other claim parameters. For example, the method 200 may be performed by the computing device 102, the computing device 152, and/or the computing device 162. For ease of discussion, and not for limitation purposes, the method 200 is described with simultaneous reference to FIGS. 1 and 2, although the method 200 may be performed by or in conjunction with systems other than the system 100 of FIG. 1 and the system 150 of FIG. 3.

The method 200 includes obtaining 202 one or more images of damage to a vehicle. Typically, the plurality of images includes images of damaged portions of the vehicle, and the images may capture the vehicle from different angles. The plurality of images may be obtained (block 202) at a computing device 102 of a system 100 configured to predict, identify, determine, and/or generate vehicle claim information (e.g., one or more replacement parts, labor types and costs, amounts, scores, other items and/or information that is or may be generated by resolving a vehicle insurance claim, and/or other information corresponding to repairing a subject vehicle). The plurality of images may be obtained by electronically receiving the images from another computing device, the plurality of images may be received via a camera interface of the computing device 102, or the computing device 102 may retrieve the plurality of images from a data storage area.

The plurality of images are operated on by the method 200 (e.g., are image processed) to generate data used to predict, identify, generate, create, and/or determine one or more types of vehicle claim information for a damaged vehicle. (As previously discussed, although the term "vehicle claim information" is utilized herein, the method 200 may apply to damaged vehicles that are not associated with any insurance claim, e.g., when a vehicle owner desires to repair his or her vehicle without making an insurance claim.) The method 200 may process the obtained images to create image data used to predict one or more replacement parts, labor types and costs, amounts, other items and/or information that is or may be generated by resolving a vehicle insurance claim, and/or other information corresponding to repairing the subject vehicle. Additionally or alternatively, the method 200 may process the obtained images to determine image data used to predict a score corresponding to the vehicle insurance claim (such as a customer satisfaction score or a score indicative of a probability of an occurrence of an event during the claim resolution process, e.g., a re-inspection). In an embodiment, the method 200 includes receiving an indication of one or more types of vehicle claim information that is desired to be predicted, identified, generated, and/or determined.

In an implementation, the method 200 includes generating an image attribute vector corresponding to the one or more images and indicative/descriptive of content contained within the one or more images (block 205). For example, the computing device 102 itself may perform an image attribute extraction, such as the image attribute extraction 172, or the computing device 102 may request another application, device or system to perform an image attribute extraction. Typically, the output of the image attribute extraction 172 includes an image attribute vector corresponding to each of the one or more images, which may include a plurality of image attribute types and their respective values, such as images attributes related to detected features, colors, textures, statistical measures, etc. within an image.

Further, the method 200 includes causing the image attribute vector corresponding to at least one image of the damaged vehicle to be input into or provided to an information prediction model (e.g., the model 158a, 158b of FIG. 2) to predict vehicle claim information, such as one or more replacement parts, labor types and costs, amounts, scores, other items and/or information that is or may be generated by resolving a vehicle insurance claim, and/or other information corresponding to repairing the subject vehicle (block 210). The information prediction model may have been generated based on a data analysis performed on historical vehicle insurance claim data. As previously discussed, the data analysis performed on the historical claim data may be, for example, a linear regression analysis, a multivariate regression analysis such as the Ordinary Least Squares algorithm, a logistic regression analysis, a K-th nearest neighbor (k-NN) analysis, a K-means analysis, a Naïve Bayes analysis, another suitable or desired predictive data analysis, one or more machine learning algorithms, or some combination thereof. The historical vehicle insurance claim data may include partial and total loss vehicle claim data obtained or collected from one or more insurance companies and/or from other sources such as repair shops, body shops, accident report databases, etc. Generally, the claim data corresponds to vehicle insurance claims that have been resolved, and includes claim data such as historical image attribute types and their corresponding values, historical images of damage to vehicles, settlement estimates and corresponding repairs, supplement amounts and corresponding repairs, whether or not re-inspections were performed, final settlement amounts, date of claims, identification of one or more repair facilities and their locations, a level of quality of the repairs, customer service indicator scores, actual values of other vehicle claims amounts and/or scores, any of the claim parameters in the previously discussed list, and/or other claim parameters.

The information prediction model (e.g., the information prediction model 158a, 158b) is configured to generate or output a prediction, identification, or generation of vehicle claim information based on the image attribute vector and optionally based on one or more claim attributes, parameters, and/or properties corresponding to the damaged vehicle that are input into the model. The inputs into the information prediction model include at least some of the image attributes in an image attribute vector corresponding to an image of the damaged vehicle, and optionally one or more values of one or more claim attributes, parameters, and/or properties that were determined, by the data analysis, to be more strongly correlated to a magnitude of a desired amount or score for the vehicle insurance claim than are other claim attributes, parameters, and/or properties. Based on the inputs (e.g., independent variables of the model) and one or more mappings included in the model, the model determines one or more outputs (e.g., dependent variables of the model), including the predicted, identified, determined, generated, and/or created vehicle claim information.

The method 200 includes obtaining or receiving the predicted, identified, determined, generated, and/or created vehicle claim information from the information prediction model (block 212), and indications of at least some of the predicted information may be provided to a user interface and/or to a recipient computing device (block 215). For example, at least some of the indications are provided to a user interface of the computing device 102 or to a remote user interface (e.g., via a web portal), and/or at least some of the indications are transmitted to another computing device (e.g., a computing device associated with the repair facility or a back-end system of an insurance carrier). Typically, the indication(s) of the predicted vehicle claim information is provided to the user interface and/or to another computing device 215 at an early stage of the claim resolution process, e.g., at FNOL. Indeed, in some embodiments, the entirety of the method 200 is performed at FNOL, e.g., by a computing device or tablet of a field assessor, or by a field computing device or tablet in conjunction of a back-end system.

In an embodiment in which one or more replacement parts are determined via the block 212, the method 200 may include ordering the one or more replacement parts and/or repairing the damage vehicle using the one or more replacement parts.

The techniques, systems, methods and apparatuses described herein for utilizing an image processing system for vehicle damage (e.g., to identify, predict, or determine parts needed to repair a damaged vehicle as well as identify, predict, or determine other vehicle claim information, such as amounts, scores, and/or other information), allow the replacement parts for the damaged vehicle to be identified (and in some cases, ordered) based on images of the damaged vehicle. Indeed, in some embodiments, the techniques, systems, methods and apparatuses of the present application allow the identification, prediction, or determination of parts needed to repair the damaged vehicle (as well as other vehicle claim information) to be determined solely based on the images of the damaged vehicle. For example, the identification, prediction, or determination of parts needed to repair the damage vehicle (and/or other vehicle claim information) may be performed without any user input other than that of providing the images. In particular, a user is not required to identify, label, or otherwise provide any other information along with the images of the damaged vehicle in order to be informed of the parts needed to repair the vehicle. Indeed, in some embodiments, the method 200 may be entirely automatically performed without any user input and/or interaction at all, aside from obtaining the images of the damaged vehicle (block 202). As such, in an example scenario, the method 200 may be performed in real-time at FNOL of an insurance claim, thereby allowing the identified parts to be ordered at FNOL. In another example scenario, if the owner of a damaged vehicle decides not to file an insurance claim, the owner may still be able to accurately obtain the identification or determination of the parts that are needed to repair the damaged vehicle without having to bring or tow the damaged vehicle to a repair facility or other assessor.

Further, the techniques, systems, methods, and apparatuses of the present application allow the identification, prediction, or determination of parts needed to repair the damaged vehicle (and/or other vehicle claim information) to be performed with much greater accuracy and much earlier in the vehicle repair process than is able to be done by a human agent, inspector, or repair facility employee, at least because the identifications, predictions, or determinations are obtained from an information prediction model that has been generated based on a plethora of historical claim data corresponding to damaged vehicles from multiple insurance carriers and other sources. Accordingly, as the predictions of the needed vehicle parts and other vehicle claim information are based on a rigorous, statistical analysis of a much wider claim data base than is known to any individual agent, inspector, or repair facility employee, and hence is more accurate, the accuracy of parts identification increases with the techniques described herein, and the time required to assess the vehicle damage, identify and order needed parts, and repair the vehicle is greatly lessened. In fact, as more and more claim data is added to the historical claim data set and the information prediction model is refined over time, the accuracy of the prediction of the vehicle parts needed to repair a damaged vehicle and/or other vehicle claim information may increase to a level where confidence in identifications, predictions, and determinations is significantly increased, and indeed, is statistically accurate.

Although the disclosure describes example methods and systems including, among other components, software and/or firmware executed on hardware, it should be noted that these examples are merely illustrative and should not be considered as limiting. For example, it is contemplated that any or all of the hardware, software, and firmware components could be embodied exclusively in hardware, exclusively in software, or in any combination of hardware and software. Accordingly, while the disclosure describes example methods and apparatus, persons of ordinary skill in the art will readily appreciate that the examples provided are not the only way to implement such methods and apparatus.

When implemented, any of the computer readable instructions or software described herein may be stored in any computer readable storage medium or memory such as on a magnetic disk, a laser disk, or other storage medium, in a RAM or ROM of a computer or processor, portable memory, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention. It is also recognized that the specific approaches described herein represent but some of many possible embodiments as described above. Consequently, the claims are properly construed to embrace all modifications, variations and improvements that fall within the true spirit and scope of the invention, as well as substantial equivalents thereof. Accordingly, other embodiments of the invention, although not described particularly herein, are nonetheless considered to be within the scope of the invention.

What is claimed is:

1. An image processing system, comprising:
    one or more data storage devices comprising non-transitory, tangible computer-readable media storing thereon historical claim data of a plurality of historical vehicle insurance claims, the historical claim data including a plurality of claim attributes including image attribute data of the plurality of historical vehicle insurance claims, respective indications of actual replacement parts of the plurality of historical vehicle insurance claims, and a plurality of other claim attributes of the plurality of historical vehicle insurance claims; and
    one or more computing devices comprising:
        a network interface via which a plurality of images of a damaged vehicle is received;
        an image attribute extraction component configured to generate, using the plurality of images of the damaged vehicle, a set of image attributes indicative of a content of at least some of the plurality of images of the damaged vehicle, the set of image attributes including one or more image attribute types and respective values of the one or more image attribute types;
        a parts identifier component configured to generate, based on the set of image attributes indicative of the damaged vehicle and an information identification model, respective indications of one or more replacement parts needed to repair the damaged vehicle;
        an output interface via which the generated, respective indications of the one or more replacement parts are provided to at least one of the network interface or a user interface; and
        a model generation component configured to utilize an access mechanism to access the historical claim data; perform a regression analysis on the accessed historical claim data to determine a subset of a plurality of image attributes that are more strongly correlated to actual replacement parts corresponding to the plurality of historical vehicle insurance claims than are other attributes of the plurality of claim attributes; create the information identification model, the information identification model having one or more independent variables corresponding to the subset of the plurality of image attributes that are more strongly correlated to the actual replacement parts corresponding to the plurality of historical vehicle insurance claims than are the other attributes of the plurality of claim attributes; and store the created information identification model at the one or more data storage devices or another one or more data storage devices.

2. The image processing system of claim 1, wherein the plurality of historical vehicle insurance claims includes historical vehicle insurance claims corresponding to a plurality of insurance carriers.

3. The image processing system of claim 1, wherein the generated respective indications of the one or more replacement parts are provided via the output interface of the image processing system at First Notice of Loss (FNOL).

4. The image processing system of claim 1, wherein the set of image attributes comprises an image attribute vector including the respective values of the one more image attribute types, and wherein the respective values of the one or more image attribute types comprise numerical values.

5. The image processing system of claim 1, wherein:
    the image attribute extraction component comprises a feature detection component;
    the one or more image attribute types include one or more of an edge, a corner, a blob, a ridge, a feature location, a feature size, a feature dimension, an intersection of features, a feature determined based on a scale-invariant feature transformation, a feature determined based on a threshold, a feature determined based on a template match, or another image attribute type; and
    at least some of the respective values of the one or more image attribute types are generated by the feature detection component operating on the plurality of images of the damaged vehicle.

6. The image processing system of claim 1, wherein:
    the image attribute extraction component comprises an image transformation component;
    the one or more image attribute types include one or more of a scale corresponding to one or more images, an orientation of the damaged vehicle within one or more images, a texture, an edge, a corner, a point, a radius, a shape, a lighting orientation, a shadow orientation, a lighting location, a shadow location, or another image attribute type; and at least some of the respective values of the one or more image attribute types are generated by the image transformation component at least one of transforming or filtering the plurality of images of the damaged vehicle.

7. The image processing system of claim 1, wherein:

the image attribute extraction component comprises a metric determination component;

the one or more image attribute types include one or more metrics from a set of metrics including a statistical measure, a gradient measure, and another metric; and at least some of the respective values of the one or more image attribute types are calculated by the metric determination component operating on the plurality of images of the damaged vehicle.

8. The image processing system of claim 7, wherein the one or more metrics include at least one of:

a frequency of a particular attribute within the plurality of images, an average of the particular attribute within the plurality of images, a distribution of the particular attribute within the plurality of images, another metric corresponding to the particular attribute within the plurality of images, an average corresponding to a color, a texture, or a contrast property within the plurality of images, a gradient corresponding to the color, the texture, or the contrast property within the plurality of images, a frequency corresponding to the color, the texture, or the contrast property within the plurality of images, a distribution corresponding to the color, the texture, or the contrast property within the plurality of images, or another metric corresponding to the color, the texture, or the contrast property within the plurality of images.

9. The image processing system of claim 1, wherein:

at least one of the one or more image attribute types included in the set of image attributes corresponding to the damaged vehicle is an independent variable of the information identification model;

the respective values of at least one of the one or more image attribute types included in the set of image attributes corresponding to the damaged vehicle are provided as input to the information identification model; and the respective indications of the one or more replacement parts needed to repair the damaged vehicle correspond to respective dependent variables of the information identification model and are received via an output of the information identification model.

10. The image processing system of claim 1, wherein the parts identifier component generates the respective indications of the one or more replacement parts needed to repair the damaged vehicle further based on at least one of a level of repair quality or a customer satisfaction score.

11. The image processing system of claim 1, wherein the respective indications of the one or more replacement parts needed to repair the damaged vehicle includes at least one indication of a replacement part type selected from: OEM (Original Equipment Manufacturer), new, recycled, reconditioned, or another replacement part type.

12. The image processing system of claim 1, wherein the claim information component is configured to generate respective indications of one or more labor types and/or labor costs needed to repair the damaged vehicle based on the image attribute data of the plurality of historical vehicle insurance claims; the regression analysis from which the information identification model is generated determines another subset of the plurality of claim attributes that are more strongly correlated to actual labor types and/or labor costs corresponding to the plurality of historical vehicle insurance claims than are other attributes of the plurality of claim attributes; the historical claim data includes respective indications of the actual labor types and/or labor costs of the plurality of historical vehicle insurance claims; and the generated, respective indications of the one or more labor types and/or labor costs are provided to the at least one of the network interface or the user interface via the output interface of the image processing system.

13. The image processing system of claim 1, wherein the parts identifier component is configured to generate a settlement amount corresponding to repairing the damaged vehicle based on the image attribute data of the plurality of historical vehicle insurance claims; the regression analysis from which the information identification model is generated determines another subset of the plurality of claim attributes that are more strongly correlated to actual settlement amounts corresponding to the plurality of historical vehicle insurance claims than are other attributes of the plurality of claim attributes; the historical claim data includes respective indications of the actual settlement amounts of the plurality of historical vehicle insurance claims; and the generated settlement amount is provided to the at least one of the network interface or the user interface via the output interface of the image processing system.

14. The image processing system of claim 1, wherein the parts identifier component is configured to generate a payout amount of an insured party corresponding to repairing the damaged vehicle based on the image attribute data of the plurality of historical vehicle insurance claims; the regression analysis from which the information identification model is generated determines another subset of the plurality of claim attributes that are more strongly correlated to actual payout amounts corresponding to the plurality of historical vehicle insurance claims than are other attributes of the plurality of claim attributes; the historical claim data includes respective indications of the actual payout amounts of the plurality of historical vehicle insurance claims; and the generated payout amount is provided to the at least one of the network interface or the user interface via the output interface of the image processing system.

15. The image processing system of claim 1, wherein the parts identifier component is configured to generate respective indications of one or more respective values of one or more other parameters corresponding to repairing the damaged vehicle based on the image attribute data of the plurality of historical vehicle insurance claims; the regression analysis from which the information identification model is generated determines another subset of the plurality of claim attributes that are more strongly correlated to actual respective values of the one or more other parameters corresponding to the plurality of historical vehicle insurance claims than are other attributes of the plurality of claim attributes; the historical claim data includes respective indications of the actual respective values of the one or more other parameters of the plurality of historical vehicle insurance claims; and the generated, respective indications of the one or more respective values of the one or more other parameters are provided to the at least one of the network interface or the user interface via the output interface of the image processing system.

16. The image processing system of claim 15, wherein the one or more other parameters include at least one of: a level of repair quality, a customer satisfaction score, a settlement amount, a towing cost, a paint cost, a tire cost, a re-inspection occurrence, a re-inspection cost, a hazardous waste disposal cost, a replacement part type, a payout amount for an insured party, a supplement occurrence, a supplement cost, a number of labor hours, a labor cost, or a labor type.

17. The image processing system of claim 1, wherein at least one of the network interface, the image attribute extraction component, the parts identifier component, the model generation component, or the output interface comprises hardware.

18. The image processing system of claim 17, wherein at least one of the network interface, the image attribute extraction component, the parts identifier component, the model generation component, or the output interface comprises software or firmware.

19. The image processing system of claim 18, wherein the software comprises a set of computer-executable instructions stored on one or more memories, the hardware comprises the one or more memories, and the image processing system further comprises one or more processors for executing the set of computer-executable instructions.

20. The image processing system of claim 1, wherein at least one of (i) the set of image attributes corresponding to the damaged vehicle, (ii) the respective indications of the one or more replacement parts needed to repair the damaged vehicle, or (iii) respective indications of one or more values of one or more other parameters corresponding to repairing the damaged vehicle and generated by the parts identifier component are at least one of (a) stored in at least one of the one or more data storage devices or in another one or more data storage devices, or (b) provided to the at least one of the network interface or the user interface via the output interface of the image processing system.

21. A method of image processing, comprising:
creating, by using a model generation component of an image processing system, an information identification model, including utilizing the model generation component to perform a regression analysis on historical claim data of a plurality of historical vehicle insurance claims,
the historical claim data including a plurality of claim attributes including image attribute data of the plurality of historical vehicle insurance claims, respective indications of actual replacement parts of the plurality of historical vehicle insurance claims, and a plurality of other claim attributes of the plurality of historical vehicle insurance claims,
the regression analysis to determine a subset of a plurality of image attributes that are more strongly correlated to actual replacement parts corresponding to a plurality of historical vehicle insurance claims than are other attributes of a plurality of claim attributes, the information identification model having one or more independent variables corresponding to the subset of the plurality of image attributes that are more strongly correlated to the actual replacement parts corresponding to the plurality of historical vehicle insurance claims than are the other attributes of the plurality of claim attributes;
storing the information identification model at one or more data storage devices of the image processing system;
obtaining, via a network interface of the image processing system, a plurality of images of a damaged vehicle;
generating, by using an image attribute extraction component of the image processing system, a set of image attributes from the plurality of images of the damaged vehicle, the set of image attributes indicative of a content of at least some of the plurality of images of the damaged vehicle, and the set of image attributes including one or more image attribute types and respective values of the one or more image attribute types;
generating, by using a parts identifier component of the image processing system, and based on the set of image attributes and the stored information identification model, one or more indications of one or more replacement parts needed to repair the damaged vehicle; and
providing, via an output interface of the image processing system, the generated, one or more indications of the one or more replacement parts needed to repair the damaged vehicle to a recipient.

22. The method of claim 21, wherein the method is performed at First Notice of Loss (FNOL) corresponding to the damaged vehicle.

23. The method of claim 21, further comprising at least one of ordering the one or more replacement parts, or repairing the damage vehicle using the one or more replacement parts.

24. The method of claim 21, wherein generating the set of image attributes from the plurality of images of the damaged vehicle comprises at least one of detecting one or more features within the plurality of images, transforming at least one image of the plurality of images, filtering the at least one image or another image of the plurality of images, or calculating one or more metrics for at least one feature, color, texture, or contrast property within the plurality of images.

* * * * *